(12) United States Patent
Taniguchi et al.

(10) Patent No.: US 7,791,997 B2
(45) Date of Patent: Sep. 7, 2010

(54) INFORMATION RECORDING MEDIUM AND INFORMATION RECORDING DEVICE AND METHOD

(75) Inventors: Shoji Taniguchi, Saitama (JP); Eiji Muramatsu, Saitama (JP); Toshio Suzuki, Saitama (JP); Masahiro Kato, Saitama (JP); Kazuo Kuroda, Saitama (JP); Kunihiko Horikawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 730 days.

(21) Appl. No.: 10/577,439

(22) PCT Filed: Jun. 6, 2005

(86) PCT No.: PCT/JP2005/010340

§ 371 (c)(1),
(2), (4) Date: Oct. 7, 2006

(87) PCT Pub. No.: WO2005/122159

PCT Pub. Date: Dec. 22, 2005

(65) Prior Publication Data

US 2007/0121449 A1 May 31, 2007

(30) Foreign Application Priority Data

Jun. 10, 2004 (JP) .............................. 2004-172529

(51) Int. Cl.
*G11B 5/00* (2006.01)
(52) U.S. Cl. .................. 369/47.53; 369/94; 369/257.1; 369/283; 369/286
(58) Field of Classification Search ........................ None
See application file for complete search history.

(56) References Cited

U.S. PATENT DOCUMENTS 3,716,455 A * 2/1973 Lemelson .................... 435/210

(Continued)

FOREIGN PATENT DOCUMENTS

AU 2003289079 * 7/2004

(Continued)

OTHER PUBLICATIONS

ECMA: Standardizing Information and Communication Systems, 120 mm DVD Rewritable Disk (DVD-RAM), Standard ECMA-272, $2^{nd}$ Edition, Jun. 1999, No. 272, pp. 1-99, XP002186767.

*Primary Examiner*—Joseph H Feild
*Assistant Examiner*—Ifedayo Iluyomade
(74) *Attorney, Agent, or Firm*—Young & Thompson

(57) ABSTRACT

An information recording medium includes:
a first recording layer to for recording first information; and
one or a plurality of second recording layers, disposed on the first recording layer, for recording second information.

Each recording layer has a predetermined area in which power calibration is performed to detect an optimum recording power of laser light for recording, which is transmitted through the first recording layer and other layers of the second recording layers, the first recording layer, the other layers of the second recording layers, and each of the second recording layers arranged in this order as viewed from an irradiation side of the laser light, and in a facing area, which faces the predetermined area, in the other layers of the second recording layers and the first recording layer, by forming embossed pits.

9 Claims, 8 Drawing Sheets

U.S. PATENT DOCUMENTS

| | | | |
|---|---|---|---|
| 7,102,987 B2 * | 9/2006 | Hirotsune et al. | 369/275.3 |
| 2003/0185121 A1 * | 10/2003 | Narumi et al. | 369/47.53 |
| 2005/0078578 A1 * | 4/2005 | Sasaki | 369/47.53 |
| 2005/0276212 A1 * | 12/2005 | Kato et al. | 369/275.1 |

FOREIGN PATENT DOCUMENTS

| | | |
|---|---|---|
| EP | 1 244 096 | 9/2002 |
| EP | 1 318 509 | 6/2003 |
| JP | 2001-052337 | 2/2001 |
| JP | 2003-022532 | 1/2003 |

\* cited by examiner

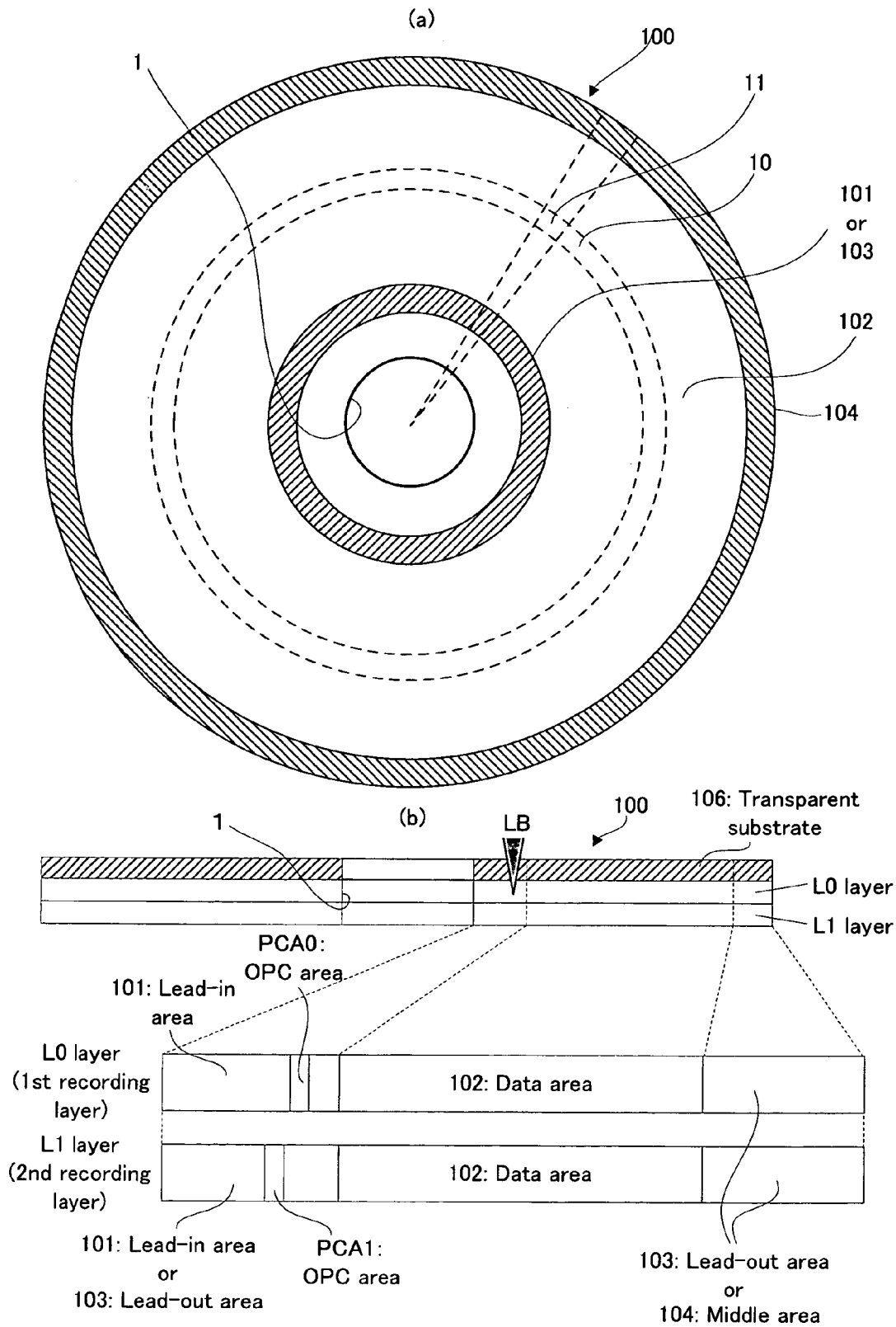
[FIG. 1]

[FIG. 2]
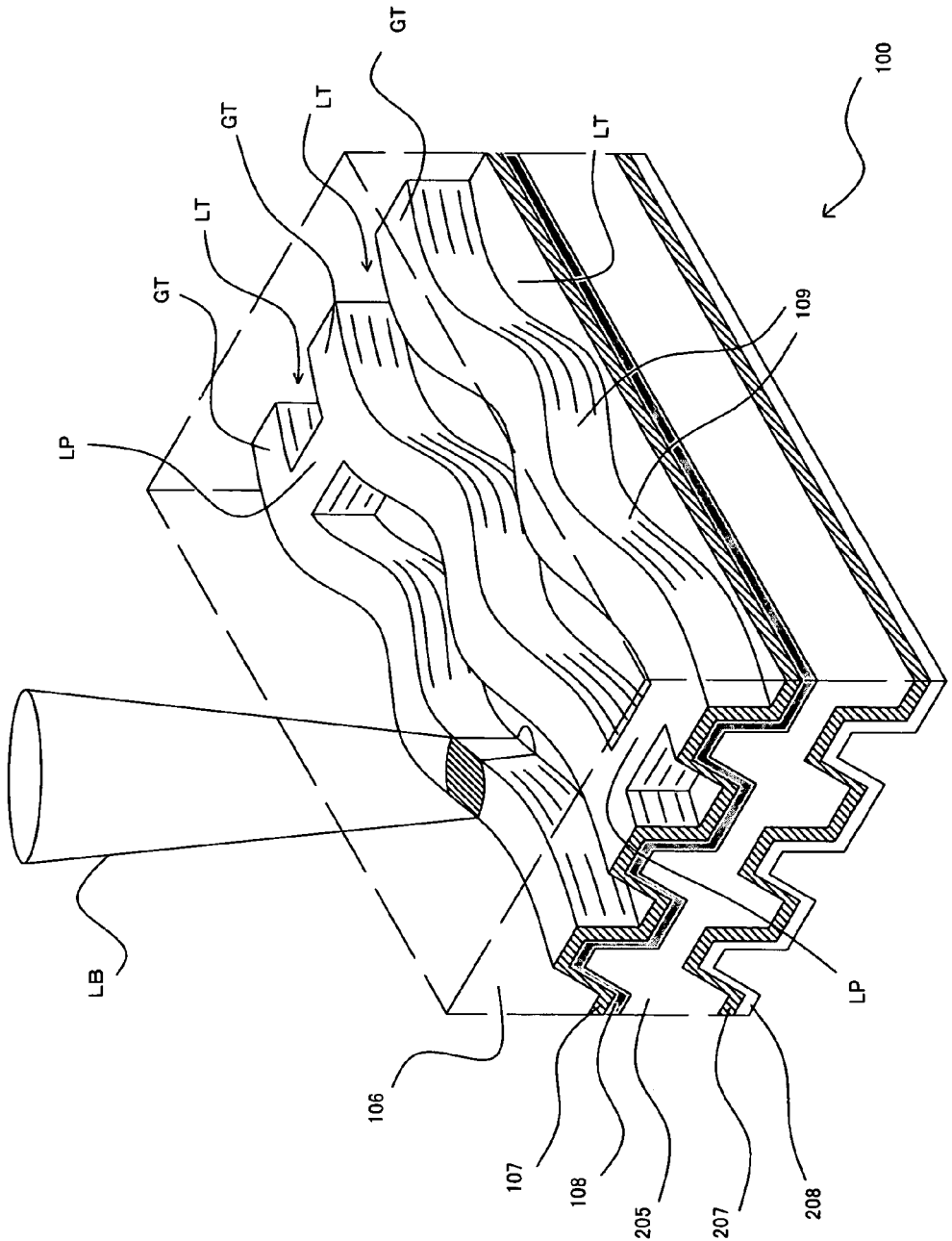

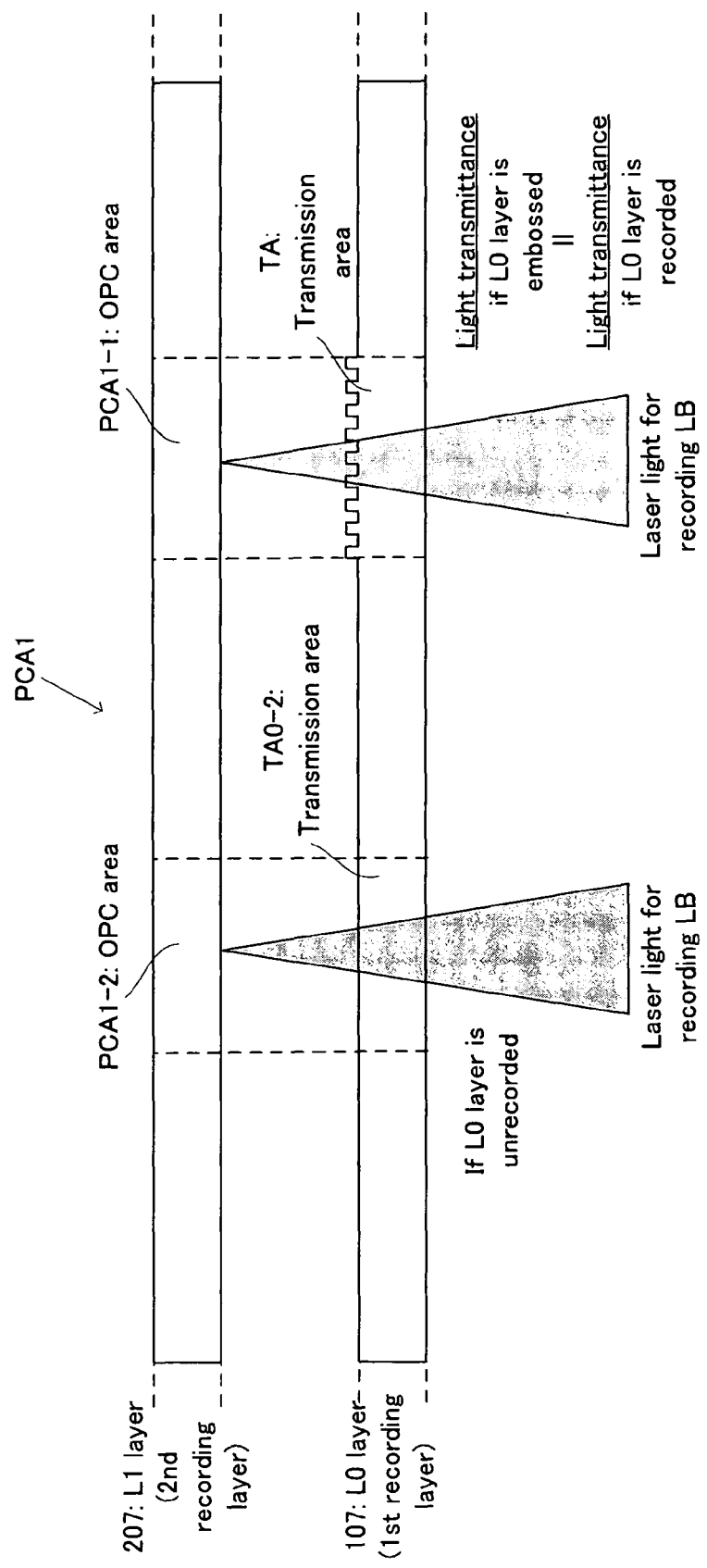
[FIG. 3]

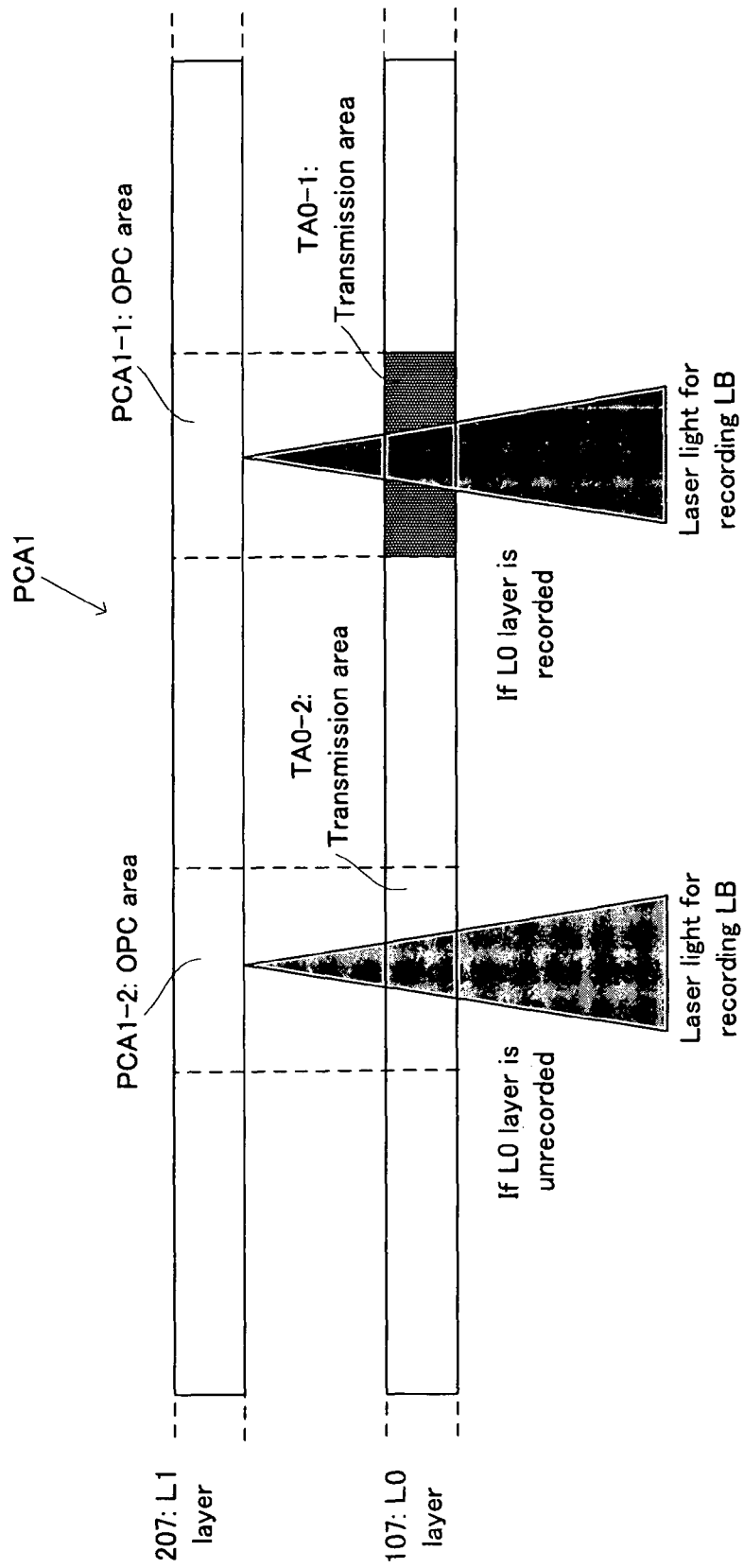

[FIG. 5]
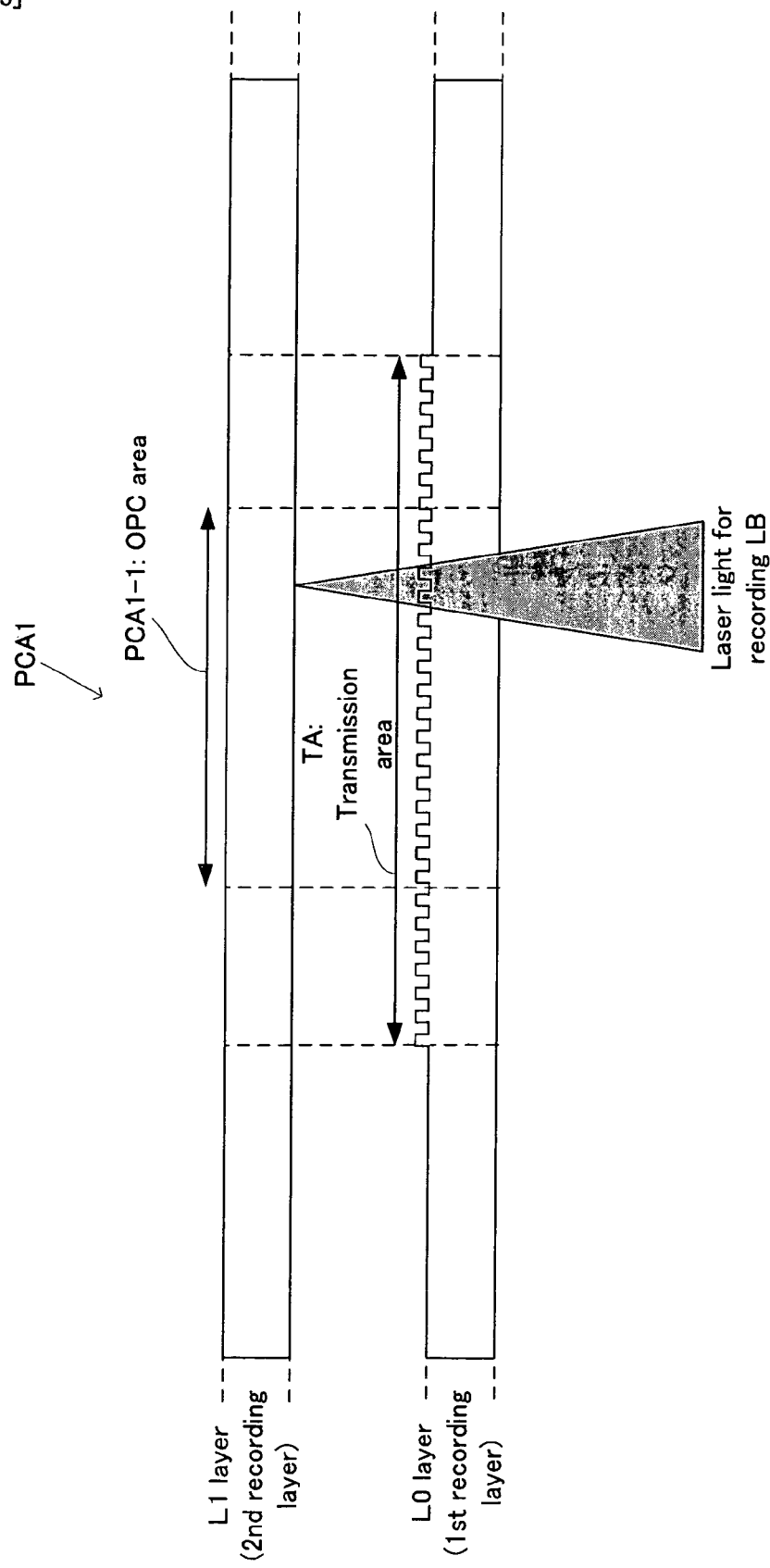

[FIG. 6]
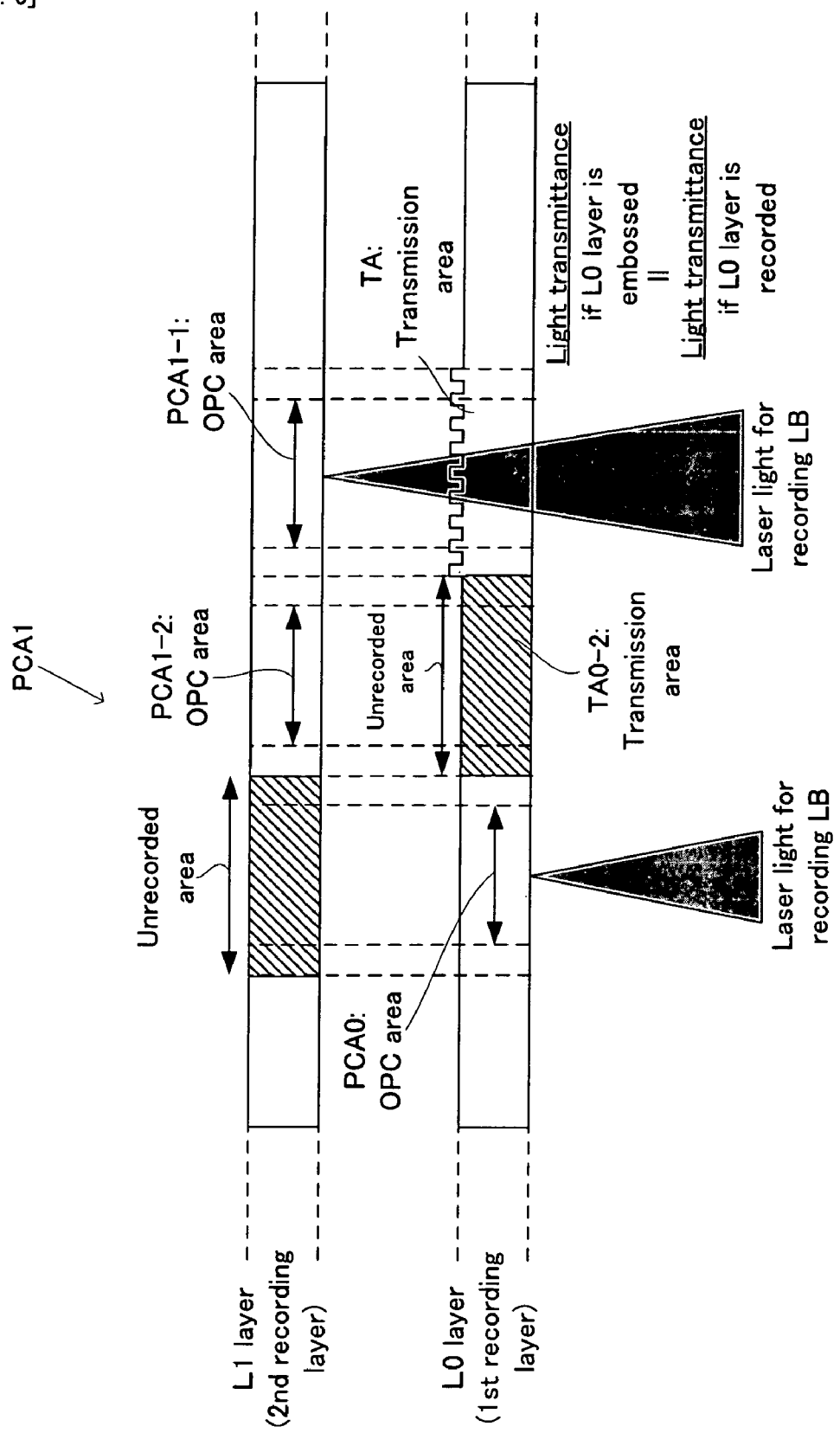

[FIG. 7]
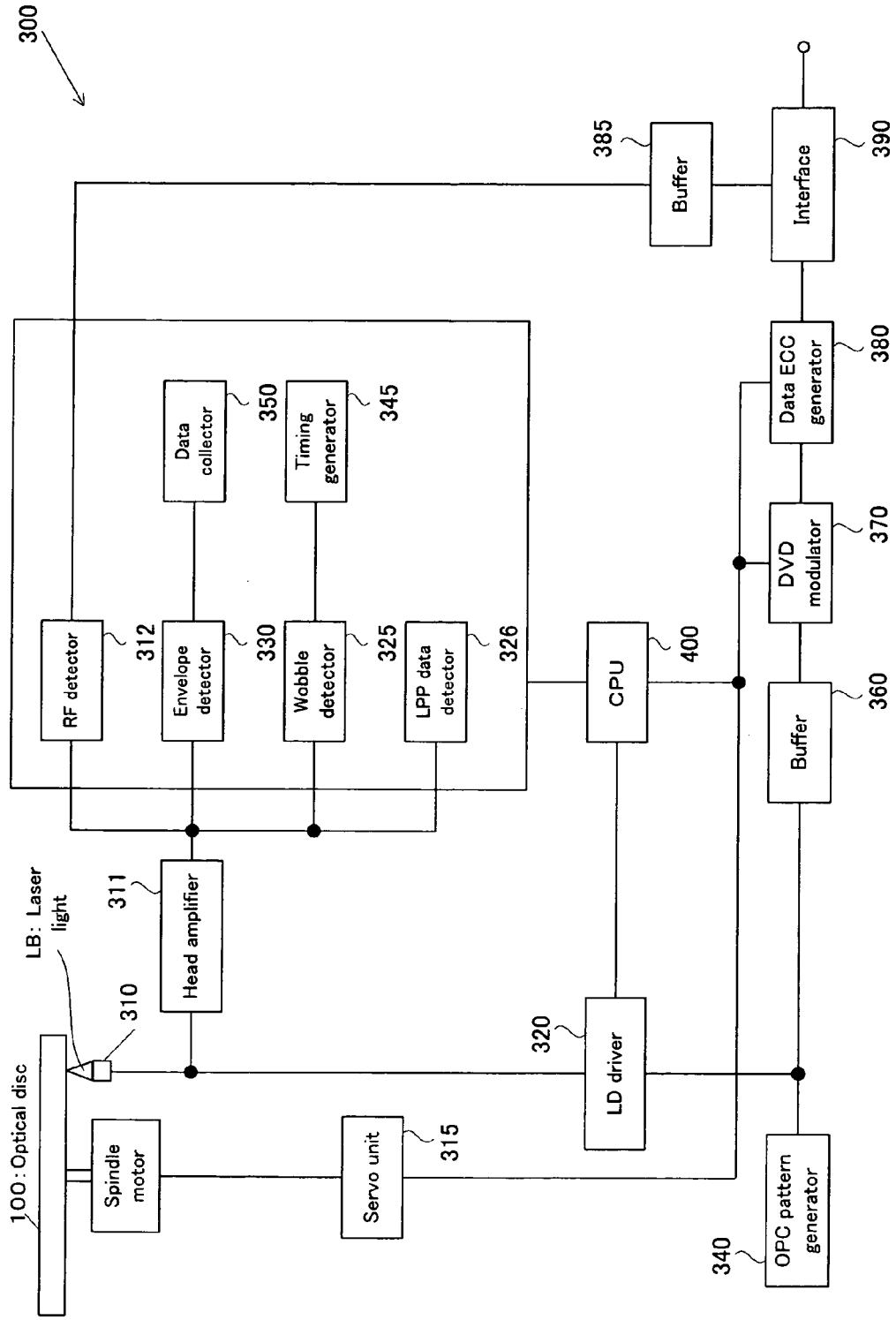

[FIG. 8]
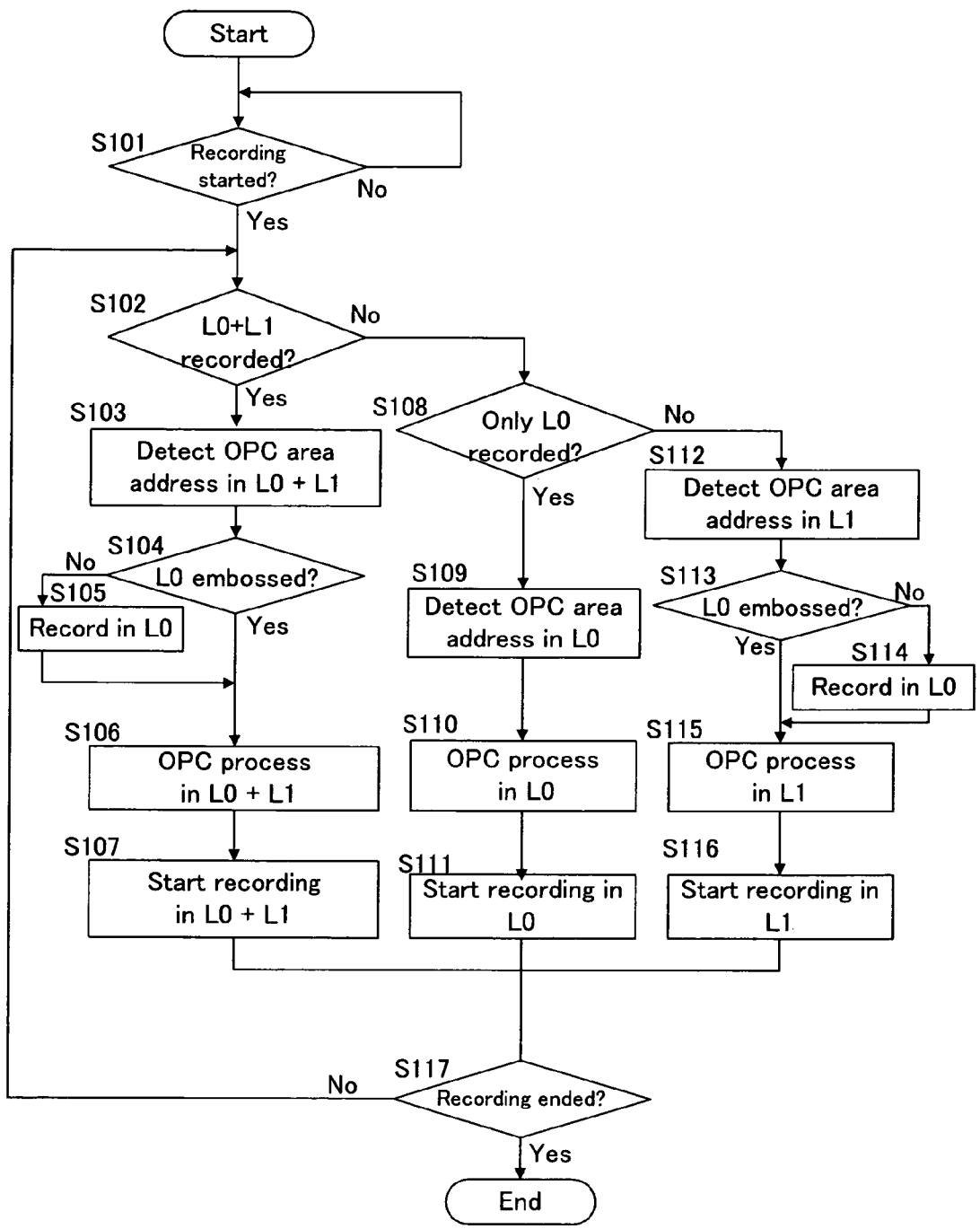

INFORMATION RECORDING MEDIUM AND INFORMATION RECORDING DEVICE AND METHOD

TECHNICAL FIELD

The present invention relates to an information recording medium, such as a DVD, an information recording apparatus, such as a DVD recorder, and an information recording method.

BACKGROUND ART

For example, in the information recording medium, such as a CD and a DVD, there are developed a multiple layer or multilayer type, or dual layer type optical disc and so on, in which a plurality of recording layers are stacked or laminated on the same substrate. Then, in the information recording apparatus, such as a CD recorder, for recording information onto such a dual layer type (i.e. two-layer type) optical disc, the information is recorded into a recording layer located on the front or the closest side as viewed from the emission or irradiation side of laser light (referred to as an "L0 layer" in this application, as occasion demands), in a rewritable method or irreversible change recording method by irreversible change recording heat by using heat or the like, by focusing the laser light for recording on the L0 layer. Moreover, the information is recorded into a recording layer located on the rear or the farthest side of the L0 layer as viewed from the irradiation side of the laser light (referred to as an "L1 layer" in this application), in a rewritable method or irreversible change recording method by irreversible change recording heat by using heat or the like, by focusing the laser light on the L1 layer through the L0 layer or the like.

Moreover, in the case where data information is recorded onto this type of optical disc or the like, an optimum recording laser power (referred to as an "optimum recording power" in this application, as occasion demands) is set by an OPC (Optimum Power Control) process, depending on the type of the optical disc and the type and recording rate of the information recording/reproducing apparatus, and so on. That is, the calibration is performed for the recording power. By this, it is possible to realize an appropriate recording operation in response to variation in characteristics of the information recording surface of the optical disc. For example, if the optical disc is loaded and a writing command is inputted, data for test writing is recorded into an OPC area with sequentially changing optical intensity, so that a so-called "test writing process" is performed. In particular, there is disclosed a technology in which the OPC area is provided for each of the two recording layers, and the OPC process is performed for each of the two layers.

In addition, in the case of the two-layer type optical disc, with regard to the detection of the optimum recording power in the L1 layer, it is necessary to properly respond to two types of recording states in the L1 layer through which the laser light is transmitted. This is because, normally, if the L0 layer is already recorded, the light transmittance to the L1 layer of the L0 layer decreases, which increases the value of the optimum recording power. On the other hand, if the L0 layer is unrecorded, the light transmittance to the L1 layer of the L0 layer is relatively high, which reduces the value of the optimum recording power.

Then, as described in a patent document 1 and the like, there is also disclosed a technology in which if the OPC process is performed in the L1 layer, at first, the data information is recorded into the L0 layer, and then, the OPC process is more properly performed in the L1 layer.

Patent document 1: Japanese Patent Application Laying Open NO. 2001-52337

DISCLOSURE OF INVENTION

Subject to be Solved by the Invention

However, when the optimum recording power is detected in the above-mentioned OPC process in the L1 layer, there is such a technical problem that it is necessary to perform a process of making the L0 layer, through which the laser light is transmitted, in a recorded condition.

In order to solve the above-mentioned conventional problems, it is therefore an object of the present invention to provide a multilayer type information recording medium on which test writing can be efficiently performed and record information can be efficiently recorded in each of a plurality of recording layers, as well as an information recording apparatus and an information recording method capable of efficiently recording the information onto such an information recording medium.

Means for Solving the Subject

Information Recording Medium

The above object of the present invention can be achieved by an information recording medium provided with: a first recording layer to record therein first information which is at least one portion of record information; and one or a plurality of second recording layers, which are disposed on the first recording layer, to record therein second information which is at least another portion of the record information, wherein each of the second recording layers has a predetermined area in which power calibration is performed to detect an optimum recording power of laser light for recording, which is transmitted through the first recording layer and other layers of the second recording layers, the first recording layer, the other layers of the second recording layers, and said each of said second recording layers arranged in this order as viewed from an irradiation side of the laser light, and in a facing area which faces the predetermined area in the other layers of said second recording layers and the first recording layer, by forming embossed pits, light transmittance of the facing area is made closer to (i) light transmittance under an assumption that (i-1) the embossed pits are not formed and that (i-2) the other layers and the first recording layer are already recorded, as compared to (ii) light transmittance under an assumption that (ii-1) the embossed pits are not formed and that (ii-2) the other layers and the first recording layer are unrecorded.

According to the information recording medium of the present invention, the first recording layer and the one or the plurality of second recording layers are stacked or laminated on one side of a disc-shaped substrate, for example. The information recording medium is a two-layer type or a multilayer type DVD or optical disc, or the like. The record information, such as audio, video information or content information, can be recorded into the first recording layer. The record information, such as audio, video information or content information, can be recorded into each of the second recording layers. By virtue of such construction, the laser light for recording or reproduction is irradiated to the substrate, the first recording layer, the other layers of the second recording layers, and each of the second recording layers, in this order. More specifically, if each of the second recording layers is the second layer, as counted from the irradiation direction of the laser light for recording, there are no other layers of the second recording layers. Moreover, if each of the second recording layers is the third layer, there is one other layer of the second recording layers. If each of the second recording layers is the fourth layer, there are two other layers of the second recording layers.

Each of the second recording layers is provided with the predetermined area, such as an OPC area, in which the power calibration is performed to detect the optimum recording power of the laser light for recording.

Particularly in the present invention, the facing area which faces the predetermined area is provided in the first recording layer and the other layers of the second recording layers. In the facing area, it is possible to adjust the light transmittance of the laser light for recording, by forming the embossed pits. If the embossed pits are not formed in the facing area in the first recording layer and the other layers of the second recording layers, such a process is required that the facing area in the first recording layer and the other layers of the second recording layers, through which the laser light is transmitted, is made in a recorded condition by an information recording apparatus described later, in order to properly detect the optimum recording power of the predetermined area of each of the second recording layers.

As opposed to this, according to the present invention, by forming the embossed pits in the facing area provided in the first recording layer and the other layers of the second recording layers upon the production of the information recording medium, such as an optical disc, for example, it is possible to make the light transmittance of the facing area in which light is transmitted to the predetermined area of each of the second recording layers, closer to (i) the light transmittance under the assumption that (i-1) the embossed pits are not formed and that (i-2) the first recording layer and the other layers of the second recording layers are already recorded, as compared to (ii) the light transmittance under the assumption that (ii-1) the embossed pits are not formed and that (ii-2) the first recording layer and the other layers of the second recording layers are unrecorded.

Incidentally, in order to form the facing area in the first recording layer and the other layers of the second recording layers such that the light transmittance of the facing area is made closer to (i) the light transmittance under the assumption that (i-1) the embossed pits are not formed and that (i-2) the first recording layer and the other layers of the second recording layers are already recorded, as compared to (ii) the light transmittance under the assumption that (ii-1) the embossed pits are not formed and that (ii-2) the first recording layer and the other layers of the second recording layers are unrecorded, as described above, it is only necessary to obtain desired light transmittance, independently and specifically, by forming the embossed pits, experimentally, experientially, or theoretically, or by simulation or the like.

In one aspect of the information recording medium of the present invention, the light transmittance of the facing area is set to be same as the light transmittance under the assumption that the embossed pits are not formed and that the other layers and the first recording layer are already recorded, by forming the embossed pits in the facing area.

According to this aspect, it is possible to completely omit the recording operation for setting the light transmittance of the facing area to be same as (or equal to) the light transmittance under the assumption that the other layers and the first recording layer are already recorded. Here, the expression "same as" or "equal to" includes not only a meaning of "completely equal to" but also such a meaning of the light transmittance which is equal enough to be regarded as the same, in performing the power calibration.

In another aspect of the information recording medium of the present invention, the predetermined area is smaller than the facing area.

According to this aspect, the predetermined area in which the OPC process is performed in each of the second recording layers, is made smaller than the facing area in which the embossed pits are formed in the first recording layer and the other layers of the second recording layers, so that it is possible to ensure a margin for the influence of an eccentricity between the layers, the divergence of the laser light, or the like in the two-layer type optical disc. Thus, it is possible to detect the value of the optimum recording power for each of the second recording layers, more properly.

In another aspect of the information recording medium of the present invention, encryption information for encrypting or decrypting the record information is recorded by forming the embossed pits, in the facing area.

According to this aspect, the embossed pits are formed to adjust the light transmittance. Moreover, on the optical disc of a recording type, the encryption information, such as an encryption key to encrypt or decrypt particular record information for copyright protection or CCI (Copy Control Information), is recorded by forming the embossed pits in the facing area, which allows more efficient use of the recording area.

In another aspect of the information recording medium of the present invention, control information for controlling at least one of a recording operation and a reproduction operation of the record information is recorded by forming the embossed pits, in the facing area.

According to this aspect, the embossed pits are formed to adjust the light transmittance. Moreover, on the optical disc of a recording type, the control information for controlling at least one of the recording operation and the reproduction operation of the record information is recorded by forming the embossed pits in the facing area, which allows more efficient use of the recording area.

In another aspect of the information recording medium of the present invention, at least one of the first recording layer and each of the second recording layers further has a management information recording area to record therein management information, and identification information for identifying whether or not the embossed pits are formed in the facing area, is recorded in the management information recording area, as the management information.

According to this aspect, the identification information, such as a flag, is read by the information recording apparatus described later, in a seek operation or the like, so that it is possible to realize the OPC process suitable for the information recording medium, more quickly and accurately.

In another aspect of the information recording medium of the present invention, each of the other layers and the first recording layer have a first predetermined area in which the power calibration is performed for the other layers and the first recording layer, in an area different from the facing area.

According to this aspect, the power calibration is performed for each of the second recording layers, through the embossed pits, in the predetermined area provided in each of the second recording layers. On the other hand, the power calibration is performed for the first recording layer and the other layers of the second recording layers, in the first predetermined area provided in the first recording layer and the other layers of the second recording layers.

More specifically, the facing area and the first predetermined area are constructed to be shifted away from each other in the radial direction, not to be overlapped. Thus, the laser light when the test writing is performed in the predetermined area is transmitted through the facing area or an unrecorded area, provided in the first recording layer and the other layers of the second recording layers, so that it is not transmitted through the first predetermined area. Thus, it is possible to prevent such a situation that the test writing in the predetermined area of each of the second recording layers becomes inaccurate due to the state of the first predetermined area, i.e. whether it is recorded or unrecorded with test-writing information.

If the facing area and the first predetermined area are overlapped and are not different from each other, for example, the optical characteristic, such as the light transmittance, varies in the facing area, due to the influence of the first predetermined area. Thus, the test writing in the predetermined area, performed through this area, becomes more or less inaccurate.

In another aspect of the information recording medium of the present invention, each of the second recording layers has a second predetermined area in which the power calibration is performed for each of the second recording layers, in an area which is different from the predetermined area and which does not face the facing area.

According to this aspect, each of the second recording layers further has the second predetermined area, in order to perform the power calibration with the laser light for recording, transmitted through a portion in an unrecorded condition in the first recording layer and the other layers of the second recording layers. Thus, it is possible to detect the value of the optimum recording power in accordance with the recording states of the first recording layer and the other layers of the second recording layers.

In another aspect of the information recording medium of the present invention, at least one of the first recording layer and each of the second recording layers further has a management area to record therein a value of the detected optimum recording power.

According to this aspect, the OPC process is performed at each time of the recording operation performed by the information recording apparatus described later, or simultaneously or in tandem, with respect to the first recording layer and each of the second recording layers. Then, the value of the optimum recording power for each recording layer, detected by this OPC process, is recorded into the management area. Then, by reading the value of the optimum recording power recorded in the management area, it is possible to realize a more accurate and quick recording operation.

Incidentally, instead of recording it into the management area of the information recording medium, the value of the optimum recording power may be stored in a storage apparatus, such as a memory, mounted in the information recording apparatus.

(Information Recording Apparatus)

Hereinafter, the information recording apparatus will be discussed.

The above object of the present invention can be also achieved by an information recording apparatus for recording the record information onto the information recording medium according to claim 1, the information recording apparatus provided with: a writing device for writing test-writing information which is at least another portion of the record information into the first recording layer by irradiating the laser light for recording so as to focus on the first recording layer, and for writing the test-writing information into each of the second recording layers by irradiating the laser light for recording so as to focus on each of the second recording layers; and a test-writing control device for controlling the writing device (I) to test-write the test-writing information for the power calibration of the laser light for recording with respect to each of the second recording layers, in the predetermined area through the facing area and (II) to test-write the test-writing information for the power calibration of the laser light for recording with respect to the other layers and the first recording layer, in a first predetermined area provided in an area different from the facing area.

According to the information recording apparatus of the present invention, the OPC process for at least two recording layers can be efficiently performed by the writing device, including an optical pickup or the like, with respect to the above-mentioned information recording medium of the present invention, under the control of the test-writing control device, including a CPU (Central Processing Unit) or the like, for example.

Namely, by forming the embossed pits in the facing area provided in the first recording layer and the other layers of the second recording layers upon the production of the information recording medium, such as an optical disc, for example, it is possible to set the light transmittance of the facing area in which light is transmitted to the predetermined area, to be substantially the same or completely the same as that of the facing area in the recorded condition. Therefore, it is possible to omit the recording operation for making the first recording layer and the other layers of the second recording layers, in the recorded condition, as occasion demands, before the OPC process is performed by the writing device for each of the second recording layers, under the control of the test-writing control device. Thus, according to the information recording apparatus of the present invention, it is possible to detect the value of the optimum recording power for each of the second recording layers, more quickly and accurately.

Incidentally, even the information recording apparatus of the present invention can adopt the same various aspects as those of the above-mentioned information recording medium of the present invention.

(Information Recording Method)

Hereinafter, the information recording apparatus will be discussed.

The above object of the present invention can be also achieved by an information recording method in an information recording apparatus provided with a writing device for writing test-writing information which is at least another portion of the record information, in order to record the record information onto the information recording medium according to claim 1, the information recording method provided with: a test-writing control process of controlling the writing device (I) to test-write the test-writing information for the power calibration of the laser light for recording with respect to each of the second recording layers, in the predetermined area through the facing area and (II) to test-write the test-writing information for the power calibration of the laser light for recording with respect to the other layers and the first recording layer, in a first predetermined area provided in an area different from the facing area.

According to the information recording method of the present invention, as in the case of the above-mentioned information recording apparatus of the present invention, it is possible to omit the recording operation for making the first recording layer and the other layers of the second recording layers, in the recorded condition, as occasion demands, before the OPC process is performed by the writing device for each of the second recording layers, under the control of the test-writing control device. Thus, according to the information recording method of the present invention, it is possible to detect the value of the optimum recording power for each of the second recording layers, more quickly and accurately.

Incidentally, even the information recording method of the present invention can adopt the same various aspects as those of the above-mentioned information recording apparatus of the present invention.

These effects and other advantages of the present invention become more apparent from the following embodiments.

As explained above, according to the information recording medium of the present invention, it is provided with: the first recording layer and the other layers of the second recording layers, which are provided with the facing area formed by the embossed pits which can adjust the light transmittance; and each of the second recording layers which is provided with the predetermined area. Thus, it is possible to detect the value of the optimum recording power for each of the second recording layers, more quickly and accurately. Moreover, according to the information recording apparatus and method, they are provided with, the writing device and the test-writing control device, and the test writing control process, respectively. Thus, it is possible to detect the value of the optimum recording power for each of the second recording layers, more quickly and accurately.

BRIEF DESCRIPTION OF DRAWINGS

FIG. 1 are a substantial plan view showing the basic structure of an optical disc having a plurality of recording areas in a first embodiment of the information recording medium of the present invention (FIG. 1(a)), and a schematic cross sectional view showing the optical disc and a schematic conceptual view showing a recording area structure in the radial direction of the optical disc corresponding to the cross sectional view (FIG. 1(b)).

FIG. 2 is a partially enlarged perspective view showing a recording surface of the optical disc in the first embodiment.

FIG. 3 is a schematic cross sectional view enlarging the physical structure of an OPC area used in the OPC process of the optical disc in the first embodiment.

FIG. 4 is a schematic cross sectional view enlarging the physical structure of an OPC area used in the OPC process of an optical disc in a comparison example.

FIG. 5 is a schematic cross sectional view enlarging the physical structure of an OPC area used in the OPC process of the optical disc in a second embodiment.

FIG. 6 is a schematic cross sectional view enlarging the physical structure of an OPC area used in the OPC process of the optical disc in a third embodiment.

FIG. 7 is a block diagram showing the basic structure of an information recording/reproducing apparatus according to an embodiment of the information recording apparatus of the present invention.

FIG. 8 is a flowchart showing the recording operation and the OPC process of the optical disc, performed by the information recording/reproducing apparatus, in the embodiment of the information recording apparatus of the present invention.

DESCRIPTION OF REFERENCE CODES

1 ... Center hole, 10 ... Track, 11 ... Sector, 100 ... Optical disc, 101 ... Lead-in area, 102 ... Data area, 103 ... Lead-out area, 104 ... Middle area, 106 ... Transparent substrate, 107 ... First recording layer, 108 ... Semitransparent reflective film, 109 ... Wobble, 205 ... Middle layer, 207 ... Second recording layer, 208 ... Reflective film, 300 ... Information recording/reproducing apparatus, 301 ... Spindle motor, 310 ... Optical pickup, 311 ... Head amplifier, 312 ... RF detector, 315 ... Servo circuit, 320 ... LD driver, 325 ... Wobble detector, 326 ... LPP data detector, 330 ... Envelope detector, 340 ... OPC pattern generator, 345 ... Timing generator, 350 ... Data collector, 360 ... Buffer, 370 ... DVD modulator, 380 ... Data ECC generator, 385 ... Buffer, 390 ... Interface, 400 ... CPU, GT ... Groove track, LT ... Land track, LB ... Laser light, LP ... Land pre-pit, TA (TA0-1 and TA0-2) ... Transmission area, PCA0 (PCA1, PCA1-1, and PCA1-2) ... OPC area

BEST MODE FOR CARRYING OUT THE INVENTION

Hereinafter, the best mode for carrying out the present invention will be discussed in order for each embodiment, with reference to the drawings.

(First Embodiment of Information Recording Medium)

Next, with reference to FIG. 1 to FIG. 4, an optical disc in the first embodiment of the information recording medium of the present invention will be explained in detail. Incidentally, for convenience of explanation, in FIG. 1 and FIG. 2, laser light is emitted or irradiated from the upper side to the lower side. Thus, an L0 layer (a first recording layer) is located on the upper side. On the other hand, in FIG. 3 to FIG. 6, the laser light is irradiated from the lower side to the upper side. Thus, the L0 layer (the first recording layer) is located on the lower side.

At first, with reference to FIG. 1, the basic structure of an optical disc in the first embodiment of the information recording medium of the present invention will be discussed. FIG. 1(a) is a substantial plan view showing the basic structure of an optical disc having a plurality of recording areas in an embodiment of the information recording medium of the present invention, and FIG. 1(b) is a schematic cross sectional view showing the optical disc, and a schematic conceptual view showing a recording area structure in the radial direction of the optical disc corresponding to the cross sectional view.

As shown in FIG. 1(a) and FIG. 1(b), an optical disc 100 has a recording surface on a disc main body with a diameter of about 12 cm, as is a DVD. On the recording surface, the optical disc 100 is provided with: a lead-in area 101; a data recording area 102; and a lead-out area 103 or a middle area 104, with a center hole 1 as the center. In particular, for example, the lead-in area 101 is provided with an OPC area PCA0 or PCA1 in which an OPC process is performed. Then, the recording layers or the like are stacked or laminated on a transparent substrate 106 of the optical disc 100. Then, a track or tracks 10, such as a groove track and a land track, are alternately placed, spirally or concentrically, with the center hole 1 as the center. On the track 10, data is divided and recorded by a unit of ECC block 11. The ECC block 11 is a data management unit based on a pre-format address in which record information is error-correctable.

Incidentally, the present invention is not particularly limited to the optical disc having these three areas. For example, even if the lead-in area 101, the lead-out area 103, or the middle area 104 does not exist, a data structure explained below can be constructed. Moreover, as described later, the lead-in area 101, the lead-out area 103, or the middle area 104 may be further segmentized.

In particular, as shown in FIG. 1(b), the optical disc 100 in the embodiment has such a structure that an L0 layer and an L1 layer, which constitute one example of the first and second recording layers in the present invention described later, respectively, are laminated on the transparent substrate 106.

Upon recording/reproduction of such a two-layer type optical disc 100, the recording/reproduction is performed in the L0 layer or the L1 layer, depending on which recording layer has the focus position of laser light LB, irradiated from the upper side to the lower side in FIG. 1(b). Moreover, the optical disc 100 in the embodiment is not limited to a two-layer, single-sided type, i.e., a dual layer type, but may be a two-layer, double-sided type, i.e. a dual layer, double-sided type. Furthermore, the optical disc 100 in the embodiment is not limited to the optical disc having the two recording layers, as described above, but may be an optical disc of a multilayer type which has three or more layers.

Incidentally, the recording/reproducing procedure of the two-layer type optical disc may be an opposite method in which the directions of track paths are opposite in the two recording layers, or may be a parallel method in which the directions of track paths are the same in the two recording layers, for example.

Next, with reference to FIG. 2, the physical structure of the optical disc in the first embodiment will be roughly explained. More specifically, the optical disc 100 in the first embodiment is constructed as a two-layer type optical disc in which a plurality of data zones 102 or the like are formed in a laminated structure. FIG. 2 is a partially enlarged perspective view showing a recording surface of the optical disc in the first embodiment of the information recording medium of the present invention.

As shown in FIG. 2, in the first embodiment, in the optical disc 100, a first recording layer 107 (i.e. the L0 layer) of a phase change type or of an irreversible change recording type by heat or the like which constitutes an information recording surface is laminated on and on the lower side of a disc-shaped transparent substrate 106, and a semitransparent reflective film 108 is laminated on the lower side thereof. On the information recording surface which is the surface of the first recording layer 107, a groove track GT and a land track LT are alternately formed. Incidentally, upon the recording and the reproduction of the optical disc 100, as shown in FIG. 2, for example, the groove track GT is irradiated with the laser light LB through the transparent substrate 106. For example, upon the recording, by irradiating the laser light LB with a recording laser power, the writing by a phase change or the irreversible change recording by heat is performed for the first recording layer 107, in accordance with the record data. On the other hand, upon the reproduction, by irradiating the laser light LB with a reproduction laser power weaker than the recording laser power, the data recorded in the first recording layer 107 is read.

In the first embodiment, the groove track GT is wobbled with a certain amplitude and at a certain spatial frequency. In other words, the groove track GT is wobbled, and the cycle of the wobble 109 is set to a predetermined value. On the land track LT, there is formed an address pit which is referred to as a land pre-pit LP and which indicates pre-format address information. By virtue of the two addressing (i.e. the wobble 109 and the land pre-pit LP), it is possible to obtain information necessary for disc rotation control during the recording, generation of a recording clock, or data recording, such as a recording address. Incidentally, it is also possible to record the pre-format address in advance, by modulating the wobble 109 of the groove track GT in a predetermined modulation method, such as frequency modulation and phase modulation.

Particularly in the first embodiment, a second recording layer 207 (i.e. the L1 layer) is laminated on and on the lower side of the semitransparent reflective film 108, and a reflective layer 208 is formed on the lower side thereof. The second recording layer 207 is constructed such that the recording and the reproduction of a phase change type or of an irreversible change recording type by heat or the like can be performed by irradiating it with the laser light LB through the transparent substrate 106, the first recording layer 107, and the semitransparent reflective film 108, in substantially the same manner as in the first recording layer 107. The second recording layer 207 and the reflective film 208 may be laminated, i.e. coated and formed, on the transparent substrate 106 on which the first recording layer 107 and the semitransparent reflective film 108 or the like are formed. Alternatively, after laminated, i.e. coated and formed, on different substrates, the second recording layer 207 and the reflective film 208 may be bonded or pasted on the transparent substrate 106. Incidentally, there is provided a transparent middle layer 205 made of a transparent adhesive or the like, between the semitransparent reflective film 108 and the second recording layer 207, as occasion demands, in accordance with the production method.

Upon the recording/reproduction of such a two-layer type optical disc 100, the recording/reproduction in the first recording layer 107 or the second recording layer 207 is performed, depending on which recording layer has the focus position of laser light LB, i.e. depending on which layer is focused.

Next, with reference to FIG. 3 and FIG. 4, a more detailed explanation will be given to an OPC area used in the OPC process of the optical disc 100 in the first embodiment. FIG. 3 is a schematic cross sectional view enlarging the physical structure of the OPC area used in the OPC process of the optical disc in the first embodiment. FIG. 4 is a schematic cross sectional view enlarging the physical structure of the OPC area used in the OPC process of an optical disc in a comparison example.

As shown in FIG. 3, the optical disc 100 has two recording layers, i.e. the L0 layer (i.e. a recording layer corresponding to the first recording layer 107 in FIG. 1 and FIG. 2) and the L1 layer (i.e. a recording layer corresponding to the second recording layer 207 in FIG. 1 and FIG. 2). Incidentally, for convenience of explanation, the laser light LB is irradiated from the lower side to the upper side, as opposed to FIG. 1 and FIG. 2.

The L0 layer is provided with a transmission area TA formed by embossed pits, which constitute one example of the "facing area" of the present invention and a transmission area TA0-2 in an unrecorded condition.

On the other hand, the L1 layer is provided with an OPC area PCA1 in the lead-in area, for example. Then, the OPC area PCA1 is further provided with OPC areas PCA1-1 and PCA 1-2, which constitute one example of the "predetermined area" of the present invention.

Specifically, the OPC area PCA1 is an area used for a process of detecting an optimum recording power (i.e. calibrating a recording laser power), i.e. a so-called OPC process. In particular, the OPC area PCA1 is used for the detection of the optimum recording laser power of the L1 layer. More specifically, after the test writing of an OPC pattern is completed, the test-written OPC pattern is reproduced, and the reproduced OPC pattern is subsequently sampled, to thereby detect the optimum recording power. Moreover, the value of the optimum recording power obtained by the OPC process may be stored into a storage apparatus, such as a memory described later, mounted on the side of an information recording apparatus, or recorded into a management information recording area or the like of the information recording medium. Alternatively, the OPC process may be performed at each time of the recording operation.

Then, the laser light LB for the OPC process is irradiated onto the L0 layer and the L1 layer, from the side of a not-illustrated substrate, i.e., from the lower side to the upper side in FIG. 3, by an optical pickup of an information recording/reproducing apparatus described later, and the focal distance thereof or the like is controlled. At the same time, the travel distance and direction in the radial direction of the optical disc 100 are controlled.

Particularly, in the optical disc 100 in the first embodiment, the embossed pits are formed in the transmission area TA provided in the L0 layer, upon the production of the optical disc, for example. Thus, it is possible to set the light transmittance of the transmission area TA in which light is transmitted to the OPC area PCA1-1 of the L1 layer, to be substantially the same or completely the same as the light transmittance of a transmission area TA0-1 in a recorded condition in the comparison example, explained in FIG. 4 described later. Alternatively, it is possible to make the light transmittance of the transmission area TA closer to (i) light transmittance under the assumption that (i-1) the embossed pits are not formed and that (i-2) the L0 layer is already recorded, as compared to (ii) light transmittance under the assumption that (ii-1) the embossed pits are not formed and that (ii-2) the L0 layer is unrecorded.

Therefore, it is possible to omit the recording operation for making the L0 layer in the recorded condition before the information recording apparatus performs the OPC process for the L1 layer. By this, it is possible to detect the value of the optimum recording power for the L1 layer, more quickly and accurately.

On the other hand, the value of the optimum recording power for the L1 layer, which responds to the case where the L0 layer is unrecorded, is detected by the laser light LB for recording which passes through the transmission area TA0-2 in which the L0 layer is unrecorded.

In addition, the embossed pits are formed to adjust the light transmittance. Moreover, on the optical disc of a recording type, an encryption key to encrypt or decrypt particular record information for copyright protection or CCI (Copy Control Information) or the like is recorded in the embossed pits, which allows more efficient use of the recording area.

Next, with reference to FIG. 4 showing the comparison example, a study is conducted on the operation/effect of the optical disc in the first embodiment of the information recording medium of the present invention.

As shown in FIG. 4, in the comparison example, the L0 layer is provided with a transmission area TA0-1 in the recorded condition and a transmission area TA0-2 in the unrecorded condition, in the lead-in area, for example.

On the other hand, the L1 layer is provided with an OPC area PCA1 in the lead-in area, for example, as in the above-mentioned first embodiment.

As described above, if the embossed pits are not formed in the transmission area TA0-1 of the L0 layer which faces the OPC area PCA1-1 of the L1 layer, such a process is required that the transmission area TA0-1 of the L0 layer, through which the laser light is transmitted, is made in the recorded condition by the information recording apparatus described later, in order to properly detect the optimum recording power of the OPC area PCA1-1 of the L1 layer.

As opposed to this, according to the optical disc in the first embodiment of the information recording medium of the present invention, the embossed pits are formed in the transmission area, provided in the L0 layer upon the production of the optical disc, for example, as described above, so that it is possible to omit the recording operation to make the L0 layer in the recorded condition. Thus, it is possible to detect the value of the optimum recording power for the L1 layer, more quickly and accurately.

(Second Embodiment of Information Recording Medium)

Next, with reference to FIG. 5, the OPC area used in the OPC process of the optical disc in the second embodiment will be discussed in more detail. FIG. 5 is a schematic cross sectional view enlarging the physical structure of the OPC area used in the OPC process of the optical disc in the second embodiment.

The basic structure and the OPC process in the second embodiment of the information recording medium are substantially the same as those in the first embodiment, explained with reference to FIG. 1 to FIG. 4.

Particularly in the second embodiment of the information recording medium, the first embodiment is further developed, and the OPC area PCA1-1 in which the OPC process is performed in the L1 layer is made smaller than the facing transmission area TA in which the embossed pits are formed in the L0 layer, so that it is possible to ensure a margin for the influence of an eccentricity between the layers, the divergence of the laser light, or the like in the two-layer type optical disc. Thus, it is possible to detect the value of the optimum recording power for the L1 layer, more properly.

(Third Embodiment of Information Recording Medium)

Next, with reference to FIG. 6, the OPC area used in the OPC process of the optical disc in the third embodiment will be discussed in more detail. FIG. 6 is a schematic cross sectional view enlarging the physical structure of the OPC area used in the OPC process of the optical disc in the third embodiment.

The basic structure and the OPC process in the third embodiment of the information recording medium are substantially the same as those in the first embodiment, explained with reference to FIG. 1 to FIG. 4.

Particularly in the third embodiment of the information recording medium, the first embodiment is further developed, and the OPC areas PCA1-1 and PCA1-2 provided in the L1 layer and the OPC area PCA0 provided in the L0 layer are constructed to be shifted away from each other in the radial direction, not to be overlapped. Thus, the laser light LB when the test writing is performed in the OPC areas PCA1-1 and PCA1-2 is transmitted through the transmission area TA or the transmission area TA0-2 in the unrecorded condition, provided in the L0 layer, so that it is not transmitted through the OPC area PCA0 provided in the L0 layer.

Thus, it is possible to prevent such a situation that the test writing in the OPC areas PCA1-1 and PCA1-2 becomes inaccurate due to the state of the OPC area PCA0, i.e. whether it is recorded or unrecorded with test-writing information. If there is no shift in the radial direction as in the above manner, the optical characteristic, such as the light transmittance, varies in the OPC area PCA0, depending on whether it is recorded or unrecorded. Thus, the test writing in the predetermined area, performed through this area, becomes more or less inaccurate.

(Embodiment of Information Recording Apparatus)

Next, with reference to FIG. 7 and FIG. 8, the structure and the operation of an embodiment of the information recording apparatus in the present invention will be discussed. Particularly, in the embodiment, the information recording apparatus of the present invention is applied to an information recording/reproducing apparatus for the optical disc.

(Information Recording/Reproducing Apparatus)

Next, with reference to FIG. 7, the basic structure of the information recording/reproducing apparatus in the embodiment of the information recording apparatus of the present invention will be discussed. FIG. 7 is a block diagram showing the basic structure of the information recording/reproducing apparatus according to the embodiment of the information recording apparatus of the present invention.

As shown in FIG. 7, an information recording/reproducing apparatus 300 in the embodiment is provided with: a spindle motor 301; an optical pickup 310; a head amplifier 311; a RF detector 312; a servo circuit 315; an LD driver 320; a wobble detector 325; an LPP data detector 326; an envelope detector 330; an OPC pattern generator 340; a timing generator 345; a data collector 350; a buffer 360; a DVD modulator 370; a data ECC generator 380; a buffer 385; an interface 390; and a CPU (Central Processing Unit) 400.

The spindle motor 301 is intended to rotate the optical disc 100 at a predetermined speed, under spindle servo from the servo circuit 315 or the like.

The optical pickup 310 is intended to perform the recording/reproduction with respect to the optical disc 100, and is provided with a semiconductor laser device, various lenses, an actuator, and the like. More specifically, the optical pickup 310 irradiates the optical disc 100 with the laser light, as reading light with a first power upon reproduction, and as writing light with a second power upon recording, with it modulated. The optical pickup 310 is constructed to be displaced in the radial direction or the like of the optical disc 100 by a not-illustrated actuator, slider, or the like, which is driven by the servo circuit 315.

The head amplifier 311 amplifies the output signal (i.e. the reflected light of the laser light LB) of the optical pickup 310, and outputs the amplified signal. Specifically, a RF signal as being a reading signal is outputted to the RF detector 312 and the envelope detector 330, and a push-pull signal is outputted to the wobble detector 325 and the LPP data detector 326.

The RF detector 312 is constructed to detect the RF signal and perform demodulation or the like, to thereby output the reproduction data to the exterior through the buffer 385 and the interface 390. Then, on external output equipment (e.g. a display device, such as a liquid crystal display and a plasma display, a speaker, or the like) connected to the interface 390, a predetermined content is reproduced and outputted.

The servo circuit 315 displaces the objective lens of the optical pickup 310, on the basis of a tracking error signal and a focus error signal or the like, which are obtained by processing the light receiving result of the optical pickup 310, to thereby perform various servo processes, such as tracking control and focus control. Moreover, the servo circuit 315 is constructed to servo-control the spindle motor 301, on the basis of a wobble signal obtained from the wobble of the wobbled groove tracks on the optical disc 100.

The LD driver 320 drives the semiconductor laser disposed in the optical pickup 310, in order to determine the optimum recording power in the recording and reproduction processes of the OPC pattern described later, upon the OPC process described later. After that, the LD driver 320 drives the semiconductor laser of the optical pickup 310 with the optimum recording laser power determined by the OPC process, upon the data recording. Upon the data recording, the optimum recording power is modulated in accordance with the record data.

Incidentally, one specific example of the "writing device" of the present invention is constructed by including the spindle motor 301, the optical pickup 310, the servo circuit 315, the LD driver 320, described above, or the like.

The wobble detector 325 is constructed to detect a push-pull signal which indicates the wobble signal, on the basis of the output signal corresponding to the light requirement from the head amplifier 311, which is a detector, disposed in the optical pickup 310, for receiving a reflected light beam, and to output it to the timing generator 345.

The LPP data detector 326 is constructed to detect a push-pull signal which indicates an LPP signal, on the basis of the output signal corresponding to the light requirement from the head amplifier 311, which is a detector, disposed in the optical pickup 310, for receiving a reflected light beam, and to detect pre-format address information, for example, as described later. Then, the LPP data detector 326 is constructed to output the pre-format address information to the timing generator 345.

The envelope detector 330 is constructed to detect the peak value and the bottom value of envelope detection of the RF signal as being the output signal from the head amplifier 311, in order to determine the optimum recording power, under the control of the CPU 400, upon the reproduction of the OPC pattern in the OPC process. The envelope detector 330 may include an A/D (Analog/Digital) converter or the like, for example.

The OPC pattern generator 340 is constructed to output a signal which indicates the OPC pattern to the LD driver 320, on the basis of a timing signal from the timing generator 345, upon the recording of the OPC patter in the OPC process before the recording operation.

The timing generator 345 detects absolute position information based on the management unit of the pre-format address information (e.g. ADIP word), on the basis of the pre-format address information inputted by the LPP data detector 326, upon the recording of the OPC pattern in the OPC process. Simultaneously, the timing generator 345 detects relative position information based on a slot unit (e.g. a slot unit corresponding to a length which is a natural number multiple of one cycle of the wobble signal) which is smaller than the management unit of the pre-format address information, on the basis of the cycle of the push-pull signal which indicates the wobble signal. Thus, whether or not a recording start position in the OPC process starts from the boundary of the management unit of the pre-format address information, i.e. each ADIP word, the timing generator 345 can specify the recording start position. After that, the timing generator 345 generates and outputs a timing signal for writing the OPC pattern, on the basis of the cycle of the push-pull signal which indicates the wobble signal outputted from the wobble detector 345. On the other hand, the timing generator 345 can specify a reproduction start position, upon the reproduction of the OPC pattern in the OPC process, as in the recording. After that, the timing generator 345 generates and outputs a timing signal for sampling the reproduced OPC pattern, on the basis of the cycle of the push-pull signal which indicates the wobble signal outputted from the wobble detector 345.

The data collector 350 is mainly a memory in general. For example, it is provided with an external RAM or the like. An envelope detected by the envelope detector 330 is stored into the data collector 350, and on the basis of this, the detection of an optimum recording laser power on the CPU 400, i.e., the OPC process, is performed.

The buffer 360 is constructed to store therein the record data modulated by the DVD modulator 370 and output it to the LD driver 320.

The DVD modulator 370 is constructed to perform DVD modulation with respect to the record data, and output it to the buffer 360. As the DVD modulation, for example, 8/16 modulation may be performed.

The data ECC generator 380 appends or adds a code for error correction to the record data which is inputted from the interface 390. Specifically, the data ECC generator 380 appends an ECC code in each predetermined block unit (e.g. ECC cluster unit), and outputs it to the DVD modulator 370.

The buffer 385 stores therein the reproduction data outputted from the RF detector 312, and outputs it to the external output equipment through the interface 390.

The interface 390 receives the input of the record data or the like from external input equipment, and outputs it to the data ECC generator 380. Moreover, it may be constructed to output the reproduction data outputted from the RF detector 312, to the external output equipment, such as a speaker and a display.

The CPU 400 controls the information recording apparatus 1 as a whole, by giving an instruction, i.e. by outputting a system command, to each device, such as the LD driver 320 and the servo circuit 315, in order to detect the optimum recording power. Normally, software for operating the CPU 400 is stored in an internal or external memory.

Incidentally, one specific example of the "test-writing control device" of the present invention is constructed by including the CPU 400, the envelope detector 330, the OPC pattern generator 340, the timing generator 345, the LD driver 320, and the like.

Moreover, obviously, the information recording/reproducing apparatus 300 shown in FIG. 7 also functions as an information recording apparatus which can record the data, substantially by virtue of the optical pickup 310, the LD driver 320, the buffer 360, the DVD modulator 370, the data ECC generator 380, and other constitutional elements. Moreover, obviously, it functions as an information reproducing apparatus which can reproduce the data, substantially by virtue of the optical pickup 310, the head amplifier 311, the RF detector 312, and other constitutional elements.

(Flow of Recording Operation performed by Information Recording/Reproducing Apparatus)

Next, with reference to FIG. 8, the recording operation and the OPC process of the optical disc will be discussed in detail in the embodiment of the information recording/reproducing apparatus. FIG. 8 is a flowchart showing the recording operation and the OPC process of the optical disc, performed by the information recording/reproducing apparatus, in the embodiment of the information recording apparatus of the present invention.

In FIG. 8, at first, if the optical disc 100 is loaded, a seek operation is performed by the optical pickup 352, under the control of the CPU 354, to obtain various management information required for the recording process with respect to the optical disc 100. On the basis of the management information, it is judged whether or not the recording operation of the data onto the optical disc 100 is started through the data input/output control device 306, in accordance with an instruction from exterior input equipment or the like, under the control of the CPU 354 (step S101). Here, if the recording operation of the data onto the optical disc 100 is started (the step S101: Yes), then, it is further judged whether the recording layer which is a recording target is both the L0 layer and the L1 layer (step S102). Here, if the recording layer which is the recording target is both the L0 layer and the L1 layer (the step S102: Yes), the address information in the OPC areas in which the OPC process is performed in the L0 layer and the L1 layer is specified (step S103).

Then, it is judged whether or not the embossed pits are formed in the transmission area TA or TA0-2 of the L0 layer which faces the OPC area PCA1 of the L1 layer (step S104). Here, if the embossed pits are formed in the transmission area TA or TA0-2 of the L0 layer (the step S104: Yes), the OPC process is performed for the OPC area PCA0 in the L0 layer, and the OPC process is performed for the OPC are PCA1-1 in the L1 layer by the laser light LB transmitted through the transmission area TA (step S106). Particularly in the embodiment, as explained above, it is possible to omit the preliminary recording operation in the transmission area TA of the L0 layer when the OPC process is performed by the information recording medium for the OPC area PCA1-1 of the L1 layer. Thus, it is possible to detect the value of the optimum recording power for the L1 layer, more quickly and accurately.

On the other hand, if the embossed pits are not formed in the transmission area TA or TA0-2 of the L0 layer (the step S104: No), the recording operation is performed in the transmission area TA0-2 of the L0 layer (step S105), to thereby form the recorded condition, and the operational flow goes to the above-mentioned step S106.

Then, the data is recorded into the L0 layer and the L1 layer with the optimum recording power detected in the OPC process in the step S106 (step S107).

On the other hand, as a result of the judgment in the step S102, if the recording layer which is the recording target is not the L0 layer and the L1 layer (the step S102: No), then, it is further judged whether or not the recording layer which is the recording target is only the L0 layer (step S108). Here, if the recording layer which is the recording target is only the L0 layer (the step S108: Yes), the address information in the OPC area in which the OPC process is performed in the L0 layer is specified (step S109).

Then, the OPC process is performed for the OPC are PCA0 of the L0 layer (step S110).

Then, the data is recorded into the L0 layer with the optimum recording power detected in the OPC process in the step S110 (step S111).

On the other hand, as a result of the judgment in the step S108, if the recording layer which is the recording target is not only the L0 layer, i.e. if the recording layer which is the recording target is only the L1 layer (the step S108: No), the address information in the OPC area in which the OPC process is performed in the L1 layer is specified (step S112).

Then, it is judged whether or not the embossed pits are formed in the transmission area of the L0 layer which faces the OPC area of the L1 layer (step S113). Here, if the embossed pits are formed in the transmission area of the L0 layer (the step S113: Yes), the OPC process is performed for the L1 layer (step S115). Particularly in the embodiment, as explained above, it is possible to omit the preliminary recording operation in the L0 layer when the OPC process is performed by the information recording medium for the L1 layer. Thus, it is possible to detect the value of the optimum recording power for the L1 layer, more quickly and accurately.

On the other hand, if the embossed pits are not formed in the transmission area of the L0 layer (the step S113: No), the recording operation is performed in the transmission area of the L0 layer (step S114), to thereby form the recorded condition, and the operational flow goes to the above-mentioned step S115.

Then, the data is recorded into the L1 layer with the optimum recording power detected in the OPC process in the step S115 (step S116).

Then, it is judged whether or not the recording operation of the data is ended (step S117). Here, if the recording operation of the data is ended (the step S117: Yes), the series of recording operation performed by the information recording apparatus is completed.

On the other hand, if the recording operation of the data is not ended (the step S117: No), as described above, it is judged whether the recording layer which is the recording target is both the L0 layer and the L1 layer (the step S102).

On the other hand, as a result of the judgment in the step S101, if the recording operation of the data onto the optical disc 100 is not started (the step S101: No), for example, a command to start the recording operation or the like is waited for.

In the embodiments, a write-once type or a rewritable type optical disc, such as a two-layer type DVD-R or DVD-R/W, is explained as one specific example of the information recording medium, and an information recording/reproducing apparatus for the optical disc is explained as one specific example of the information recording apparatus. The present invention, however, can be also applied to a multiple layer type optical disc, such as a three-layer type and a four-layer type, and an information recording/reproducing apparatus for the optical disc. Moreover, the present invention can be also applied to a large-capacity recording medium, such as a Blu-ray disc, and an information/reproducing apparatus for the recording medium.

The present invention is not limited to the above-described embodiments, and various changes may be made, if desired, without departing from the essence or spirit of the invention which can be read from the claims and the entire specification. An information recording medium, an information recording apparatus, and an information recording method, all of which involve such changes, are also intended to be within the technical scope of the present invention.

INDUSTRIAL APPLICABILITY

The information recording medium, the information recording apparatus, and the information recording method in the present invention can be applied to a high-density optical disc, such as a DVD and a CD, and also applied to an information recording apparatus, such as a DVD recorder.

What is claimed is:

1. An information recording medium comprising:
   a first recording layer for recording and
   a second recording layer for recording, said first recording layer and said second recording layer arranged in this order as viewed from an irradiation side of the laser light, wherein
   said second recording layer has a predetermined area in which power calibration is performed to detect an optimum recording power of the laser light for recording, which is transmitted through said first recording layer, and
   said first recording layer has a facing area which faces the predetermined area, the facing area having embossed pits, and light transmittance of the facing area being same as that of a recorded area on said first recording layer,
   said first recording layer has a first predetermined area in which the power calibration is performed for said first recording layer,
   said second recording layer has an unrecorded area which faces the first predetermined area,
   said second recording layer has a second predetermined area in which the power calibration is performed for said second recording layer,
   said first recording layer has an unrecorded area which faces the second predetermined area,
   a radial position of the predetermined area, a radial position of the first predetermined area and a radial position of the second predetermined area are different from each other.

2. The information recording medium according to claim 1, wherein the predetermined area is smaller than the facing area.

3. The information recording medium according to claim 1, wherein encryption information for encrypting or decrypting a record information is recorded by forming the embossed pits, in the facing area.

4. The information recording medium according to claim 1, wherein control information for controlling at least one of a recording operation and a reproduction operation of the record information is recorded by forming the embossed pits, in the facing area.

5. The information recording medium according to claim 1, wherein
   at least one of said first recording layer and said second recording layer further has a management information recording area to record therein management information, and
   identification information for identifying whether or not the embossed pits are formed in the facing area, is recorded in the management information recording area, as the management information.

6. The information recording medium according to claim 1, wherein
   at least one of said first recording layer and said second recording layer further has a management area to record therein a value of the detected optimum recording power.

7. An information recording apparatus for recording record information onto an information recording medium comprising: a first recording layer for recording and a second recording layer for recording, said first recording layer and said second recording layer arranged in this order as viewed from an irradiation side of the laser light, wherein said second recording layer has a predetermined area in which power calibration is performed to detect an optimum recording power of the laser light for recording, which is transmitted through said first recording layer, and said first recording layer has a facing area which faces the predetermined area, the facing area having embossed pits, and light transmittance of the facing area being same as that of a recorded area on said first recording layer, said first recording layer has a first predetermined area in which the power calibration is performed for said first recording layer, said second recording layer has an unrecorded area, in an area which faces the first predetermined area, said second recording layer has a second predetermined area in which the power calibration is performed for said second recording layer, said first recording layer has an unrecorded area, in an area which faces the second predetermined area, a radial position of the predetermined area, a radial position of the first predetermined area and a radial position of the second predetermined area are different from each other,
   said information recording apparatus comprising:
   a writing device for writing test-writing information into said second recording layer on the basis of the laser light for recording; and
   a test-writing control device for controlling said writing device to test-write the test-writing information for the power calibration of the laser light for recording with respect to said second recording layer, in the predetermined area through the facing area.

8. An information recording method in an information recording apparatus comprising a writing device for writing test-writing information, for a purpose of recording record information onto an information recording medium comprising: a first recording layer for recording and a second recording layer for recording, said first recording layer and said second recording layer arranged in this order as viewed from an irradiation side of the laser light, wherein said second recording layer has a predetermined area in which power calibration is performed to detect an optimum recording power of the laser light for recording, which is transmitted through said first recording layer, and said first recording layer has a facing area which faces the predetermined area, the facing area having embossed pits, and light transmittance of the facing area being same as that of a recorded area on said first recording layer, said first recording layer has a first predetermined area in which the power calibration is performed for said first recording layer, said second recording layer has an unrecorded area, in an area which faces the first predetermined area, said second recording layer has a second predetermined area in which the power calibration is performed for said second recording layer, said first recording layer has an unrecorded area, in an area which faces the second predetermined area, a radial position of the predetermined area, a radial position of the first predetermined area and a radial position of the second predetermined area are different from each other, said information recording method comprising:

a test-writing control process of controlling said writing device to test-write the test-writing information for the power calibration of the laser light for recording with respect to said second recording layer, in the predetermined area through the facing area.

9. An information recording medium comprising:

a first recording layer to record therein first information which is at least one portion of record information; and one or a plurality of second recording layers, which are disposed on said first recording layer, to record therein second information which is at least another portion of the record information, wherein each of said second recording layers has a predetermined area in which power calibration is performed to detect an optimum recording power of laser light for recording, which is transmitted through said first recording layer and other layers of said second recording layers, said first recording layer, the other layers of said second recording layers, and said each of said second recording layers arranged in this order as viewed from an irradiation side of the laser light, and in a facing area which faces the predetermined area in the other layers of said second recording layers and said first recording layer, by forming embossed pits, light transmittance of the facing area is made closer to (i) light transmittance under an assumption that (i-1) the embossed pits are not formed and that (i-2) the other layers and said first recording layer are already recorded, as compared to (ii) light transmittance under an assumption that (ii-1) the embossed pits are not formed and that (ii-2) the other layers and said first recording layer are unrecorded, said first recording layer has a first predetermined area in which the power calibration is performed for said first recording layer, said each of said second recording layers has an unrecorded area which faces the first predetermined area, said each of said second recording layers has a second predetermined area in which the power calibration is performed for said each of second recording layers, each of said first recording layer and said other layers of said second recording layers has an unrecorded area which faces the second predetermined area, a radial position of the predetermined area, a radial position of the first predetermined area and a radial position of the second predetermined area are different from each other.

* * * * *